(12) United States Patent
Zhang et al.

(10) Patent No.: US 11,956,452 B2
(45) Date of Patent: Apr. 9, 2024

(54) SYSTEM AND METHOD FOR H.265 ENCODING

(71) Applicant: Rockchip Electronics Co., Ltd., Fuzhou (CN)

(72) Inventors: Shanxu Zhang, Fuzhou (CN);
Hengming Chen, Fuzhou (CN);
Shengqin Zhang, Fuzhou (CN);
Delong He, Fuzhou (CN)

(73) Assignee: Rockchip Electronics Co., Ltd., Fujian (CN)

( * ) Notice: Subject to any disclaimer, the term of this patent is extended or adjusted under 35 U.S.C. 154(b) by 286 days.

(21) Appl. No.: 17/603,002

(22) PCT Filed: Apr. 10, 2020

(86) PCT No.: PCT/CN2020/084093
§ 371 (c)(1),
(2) Date: Apr. 11, 2022

(87) PCT Pub. No.: WO2020/207451
PCT Pub. Date: Oct. 15, 2020

(65) Prior Publication Data
US 2022/0232231 A1    Jul. 21, 2022

(30) Foreign Application Priority Data
Apr. 11, 2019 (WO) ................ PCT/CN2019/082189

(51) Int. Cl.
*H04N 19/13* (2014.01)
*H04N 19/159* (2014.01)
*H04N 19/176* (2014.01)
*H04N 19/196* (2014.01)
*H04N 19/86* (2014.01)
*H04N 19/96* (2014.01)

(52) U.S. Cl.
CPC .......... *H04N 19/196* (2014.11); *H04N 19/13* (2014.11); *H04N 19/159* (2014.11); *H04N 19/176* (2014.11); *H04N 19/865* (2014.11); *H04N 19/96* (2014.11)

(58) Field of Classification Search
CPC .... H04N 19/196; H04N 19/13; H04N 19/159; H04N 19/176; H04N 19/865; H04N 19/96
USPC ..................................... 375/240.02
See application file for complete search history.

(56) References Cited

U.S. PATENT DOCUMENTS

2019/0306503 A1* 10/2019 Dong ................. H04N 19/124

* cited by examiner

*Primary Examiner* — Nguyen T Truong
(74) *Attorney, Agent, or Firm* — IPRTOP LLC

(57) ABSTRACT

An H.265 encoding device is described. The encoding device may include a preprocessing module; a coarse selection module; and a precise comparison module. The preprocessing module is configured to divide a current frame from an original video into multiple CTU blocks. The coarse selection module is configured to divide a CTU block based on multiple partition modes, and perform inter-prediction and intra-prediction and generate a prediction information corresponding to the partition modes. The precise comparison module is configured to perform cost comparison, select a partition mode with the lowest cost, generate entropy coding information and reconstruction information based on the selected partition mode and its corresponding encoding information.

20 Claims, 9 Drawing Sheets

SYSTEM AND METHOD FOR H.265 ENCODING

CROSS-REFERENCE

This application is a Sect. 371 National Stage application of a PCT International Application No. PCT/CN2020/084093 filed on Apr. 10, 2020, which claims the benefit of priority of a PCT Application No. PCT/CN2019/082189 filed on Apr. 11, 2019, which claims the benefit of priority of a Chinese Patent Application No. 201810320172.5 filed with CNIPA on Apr. 11, 2018 and a Chinese Patent Application No. 20181136408.6, filed on Sep. 28, 2018, the above applications are hereby incorporated by reference in their entirety, including any appendices or attachments thereof, for all purposes.

TECHNICAL FIELD

The present disclosure is related to video encoding, and particularly to the methods and devices for performing H.265 encoding.

BACKGROUND

H.265 is a new video coding standard formulated by ITU-T VCEG after H.264. The H.265 standard revolves around the existing video coding standard H.264, retaining some of the original technologies, while improving some other technologies. The newly added technology is used to improve code stream, encoding quality, delay and algorithm complexity to achieve the optimal setting. The specific research contents include: Improving compression efficiency, improving robustness and error recovery capability, reducing real-time delay, reducing channel acquisition time and random access delay, and reducing complexity. At present, the existing H.265 algorithm generally consumes a high amount of hardware resources.

DETAILED DESCRIPTION

Figure 1:
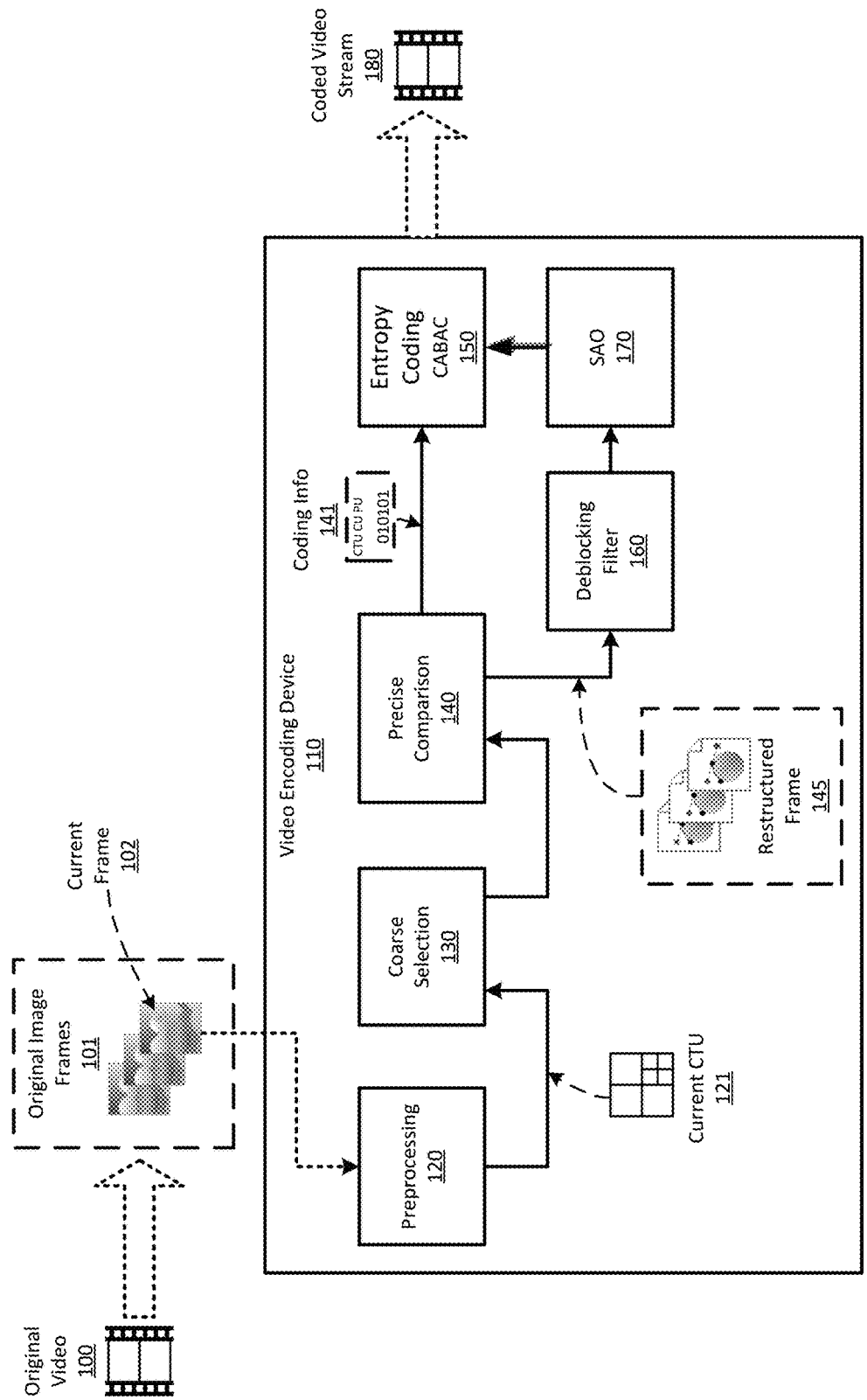
FIG. 1 shows a diagram illustrating a H.265 encoding device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 shows a diagram illustrating a H.265 encoding device, according to certain embodiments of the present disclosure. In FIG. 1, a video encoding device 110 may be a hardware module or a computer chip with video encoding function, or an electronic device containing the above module or chip, such as mobile phone, tablet computer, personal digital assistant and so on. Such electronic device may also be, for instance, personal computer and computer for industrial equipment, etc. In FIG. 1, the video encoding device 110 may be configured with a preprocessing module 120, a coarse selection module 130, and a precise comparison module 140, with the preprocessing module 120 being connected with the coarse selection module 130, and the coarse selection module 130 being connected with the precise comparison module 140.

In some embodiments, the preprocessing module 120 may be configured to divide a current frame 102 (selected from an original video 100) into multiple CTU (Coding Tree Unit) blocks. Each CTU block may be a sub-block in the current frame image, and can be any one of the 16×16 sub-blocks, 32×32 sub-blocks, or 64×64 sub-blocks. Specifically, the preprocessing module 120 can select one of the original image frames 101 from the original video 100, and pick the selected original image frame 101 as the current frame 102.

In some embodiments, based on various partition modes, the coarse selection module 130 may be configured to divide each CTU block into multiple CU (Coding Unit) blocks corresponding to a specific partition mode, and be further configured to divide the CU block into one or more corresponding PU (Prediction Unit) blocks. The coarse selection module 130 may also be used to perform inter-prediction and intra-prediction operations based on the corresponding partition mode for each CTU block, and generate a prediction information corresponding to each partition mode. The partition mode may be selected based on actual requirement. For example, in one partition mode, a current CTU 121 with the size of 64×64 may be divided into four 32×32 sub-blocks; each 32×32 sub-block may further be divided into four 16×16 sub-blocks.

In some embodiments, the precise comparison module 140 may be configured to compare the costs of multiple prediction information corresponding to different partition modes for each CTU block, and then select a partition mode with the least cost for each CTU block as well as its coding information relating to the partition mode. Based on the partition mode and corresponding coding information selected above, the precise comparison module 140 may generate an entropy coding information aiming to generate H.265 stream from the current frame 102, and may generate a reconstructed information aiming to generate a reconstructed frame from the current frame 102. In this way, the search accuracy may be improved by distributed search, while the details of reconstructed image may be better preserved, and the consumption of hardware resources may be reduced.

In some embodiments, the video encoding device may further include an entropy coding module 150 connected with precise comparison module 140. The entropy coding module 150 may be used to generate H.265 stream based on the current frame, according to the partition mode with the least cost corresponding to each CTU block and the entropy coding information generated from the corresponding coding information related to the current frame. Specifically, according to the partition mode with the least cost and the prediction mode, the precise comparison module 140 may generate the data required for the entropy coding corresponding to the CTU, such data being the coding information 141 shown in FIG. 1. The entropy coding module 150 may be used to generate the encoded video stream 190 corresponding to the original video 100, based on the data required for the entropy coding corresponding to the CTU. At the same time, the video encoding device 110 also outputs the encoded video stream 180, with one of the image frames in the encoded video 180 being a reconstructed frame 145.

In some embodiments, the image encoding device may further include a post-processing module which is connected to the precise comparison module. The post-processing module may be configured to generate the reconstructed frame corresponding to the current frame, according to the partition mode with the least cost corresponding to each CTU block and the reconstructed information generated from the corresponding coding information related to the current frame.

Preferably, the post-processing module may include a deblocking filter module 160 and a sample adaptive offset (SAO) module 170, the deblocking filter module 160 being connected with the SAO module 170. By taking advantage of the partition mode with the least cost provided by the precise comparison module and the corresponding coding information, the deblocking filter module 160 may be configured to filter the reconstructed frame. The SAO module 170 may be configured to perform SAO calculation for reconstructed frames after filtering, and transmit the calculated data to entropy coding module 150.

Figure 2:
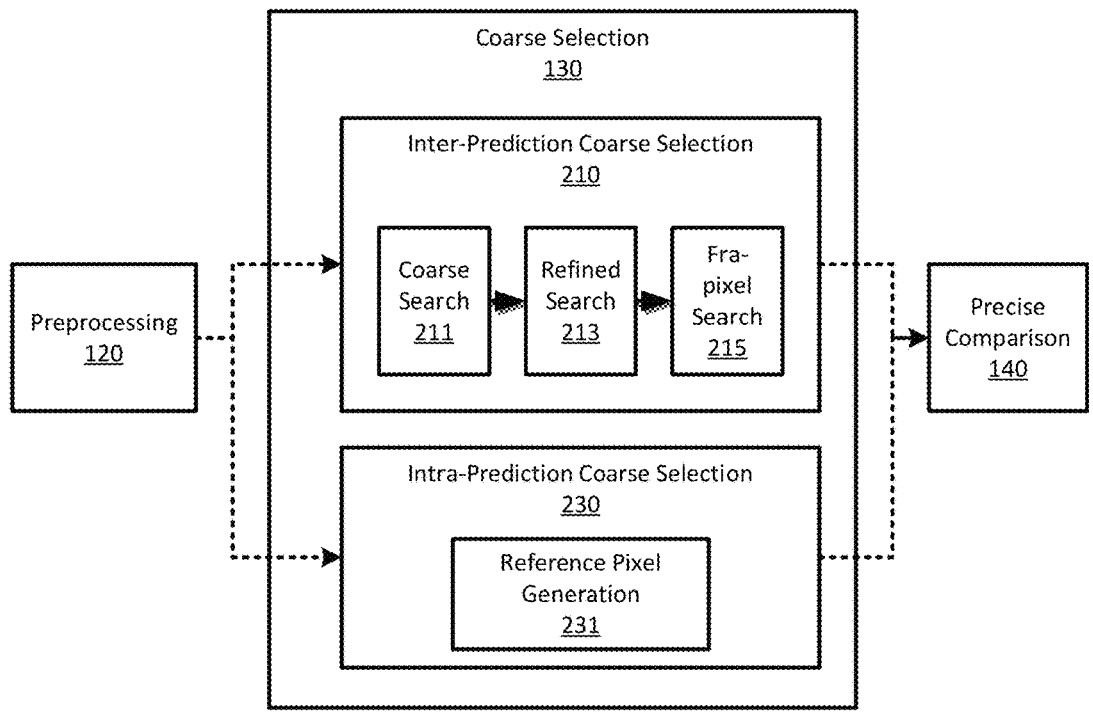
FIG. 2 shows a diagram illustrating a coarse selection module.

FIG. 2 shows a diagram illustrating a coarse selection module, according to certain embodiments of the present disclosure. As shown in FIG. 2, the coarse selection module 130 may include an inter prediction coarse selection module 210 (hereinafter "Inter-prediction module"), and an Intra prediction coarse selection module 230, (hereinafter "intra-prediction module"). The inter-prediction module 210 is respectively connected with the pre-processing module 120 and the precise comparison module 140, while the Intra-prediction module 230 is respectively connected with the pre-processing module 120 and the precise comparison module 140.

In some embodiments, the inter-prediction module 210 may be configured for inter-prediction of each PU block in each partition mode. For each PU block, the inter-prediction module 210 may select, from one or more reference frames, a reference data having cost less than a predefined cost relative to each PU block. Each PU block may have its own motion vector, which may be used to obtain the prediction information from the reconstructed reference frame. The obtaining of the prediction information may start from the current PU location according to the corresponding motion vector of the PU block.

In some embodiments, the intra-prediction module 230 may be configured for intra-prediction of each PU block in each partition mode, for selecting one or more intra-prediction directions with costs less than a preset cost value relative to each PU block, and for taking the selected intra-prediction direction as the prediction information corresponding to the partition mode.

In some embodiments, the inter-prediction module 210 also includes a coarse search module 211, a refined search module 213, and a fractional-pixel search module 215, the coarse search module 211 being connected with the pre-processing module 120 and the refined search module 213, and the refined search module 213 being connected with the fractional-pixel search module 215.

In some embodiments, the coarse search module may be configured to select a reference frame from a reference array, or to select a reference frame from the original frames or reconstructed frames. Then, the coarse search module may respectively perform the down-sampling on the reference frame and the current CTU block, and find the lowest cost pixel position by comparing the reference frame after down-sampling with the current CTU after down-sampling. Afterward, the coarse search module may calculate the coarse search vector of above pixel position relative to the current CTU block.

In some embodiments, the reference array is a list for storing reference frames, and a current frame may be retrieved from the multiple reference frames stored in the reference array, which is indexed for quick search. A reference frame includes the reconstructed frame or the original frame. Since both the reference frame and the current CTU block are obtained by down-sampling, coarse search vector calculated by the coarse search module shall correspondingly be the down-sampled search vector. Comparing with current CTU block, the coarse search vector may need to be multiplied by the down-sampling rate (e.g. 1/4), the coarse search vector may also need to be multiplied by the corresponding rate, and then be transmitted to the next processing module.

Figure 3:
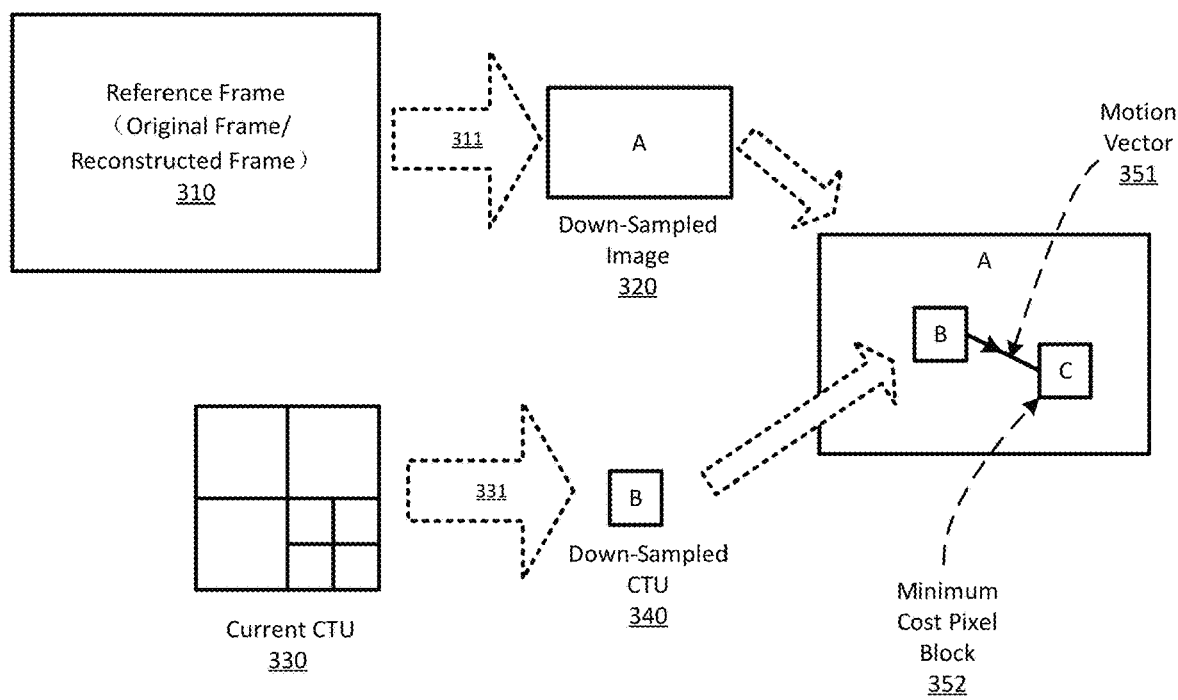
FIG. 3 shows a diagram illustrating a coarse search scenario.

FIG. 3 shows a diagram illustrating a coarse search scenario, according to certain embodiments of the present disclosure. In FIG. 3, the coarse search module selects the reference frame from the original frame or reconstructed frame, respectively performs the down-sampling on the reference frame and current CTU. Afterward, the coarse search module determines the pixel position with the lowest cost and the coarse search vector from the reference frame after the down-sampling, by comparing the reference frame with the CTU block after both of them being down-sampled.

Preferably, in the present embodiment, the reference frame has the same down-sampling scaling as the current CTU block. For example, the down-sampled image 320, obtained from the reference frame 310 with down-sampling 311, is acquired by scaling the length and width of reference frame to 1/4, while the down-sampled CTU, obtained from the current CTU 330 with down-sampling 311, is acquired by scaling the length and width of current CTU 330 to 1/4. The down-sampled CTU 340 (B sub-block in FIG. 3) may be configured as the unit to predict in the down-sampled image (A sub-block in FIG. 3), and the cost of each corresponding sub-block in the sampled CTU 340 and the down-sampled image 320 (taking each pixel in A sub-block as the center and taking the sub-block with the same size as B sub-block) is calculated in turn, and the pixel block with the lowest cost compared with the down-sampled CTU is found. The block is marked as the minimum/lowest cost pixel-block 352 (C sub-block in FIG. 3). The pixel position of the center and the coarse search vector of the minimum/lowest cost pixel-block are recorded, and the coarse search vector is the displacement vector (i.e., the motion vector 351 in FIG. 3) between the center pixel of the down-sampled CTU 340 (B sub-block in FIG. 3) and the center pixel position with the minimum cost pixel-block 352 (C sub-block in FIG. 3).

Referring back to FIG. 2. In some embodiments, the intra-prediction module 230 may further include a reference pixel generation module 231. The reference pixel generation module 231 may be configured to generate reference pixel for each PU block in each partition mode, based on the original pixel of the current frame. The reference pixel generation module 231 may predict multiple intra-prediction directions and obtain the prediction results for these directions, according to the reference pixel and the H.265 protocol. Afterward, the reference pixel generation module 231 may respectively calculate the distortion costs based on the original pixel in accordance with the prediction result of each direction. The reference pixel generation module 231 may further rank, from small to large, these distortion costs, and choose one or more intra-prediction directions with low costs.

In some embodiments, the coarse selection method of intra-prediction module is similar to the selection method of the inter-prediction module, which will not be repeated herein. The difference between them is that, in Intra-prediction, the down-sampled image Is obtained by down-sampling the original frame, and the down-sampled CTU is predicted based on this down-sampled image acquired by down-sampling the original frame. In comparison, in inter-prediction, the down-sampled image is obtained by down-sampling the reference frame, and the down-sampled CTU is predicted based on this down-sampled image acquired by down-sampling the reference frame.

Figure 6:
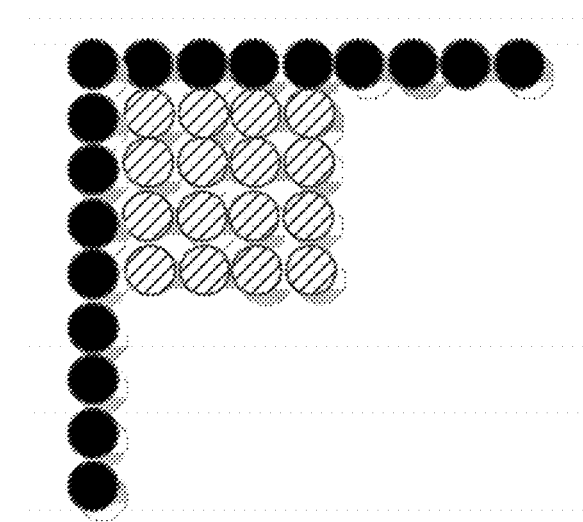
FIG. 6A-6B shows a diagram illustrating a reference pixel generation scenario.

FIGS. 6-A and 6-B show diagrams illustrating reference pixel generation scenario, according to certain embodiments of the present disclosure. As shown in FIG. 6-A and FIG. 6-B, according to H.265 protocol, reference pixel should use the reconstructed pixel. In actual hardware implementation, at one specific time, the original pixel can be obtained, while the reconstructed pixel is not available yet. Therefore, in the present disclosure, the original pixel may be selected in lieu of the reconstructed pixel.

In FIGS. 6-A and 6-B's example, each dot in the FIG. 6-B may represent a pixel. According to H.265 protocol, for a PU sub-block with 4×4 totaling 16 pixels (the dots filled with shadow), there may be 17 edge pixels (pixel filled with black) In the Figure, and these edge pixels should be filled with reconstructed pixels. When the reconstructed pixels cannot be obtained at the moment, they may be replaced by the original pixels. After the filling of edge pixels is completed, the 4×4 pixels represented by dots filled with shadows can be obtained from prediction according to the H.265 protocol.

Figure 4:
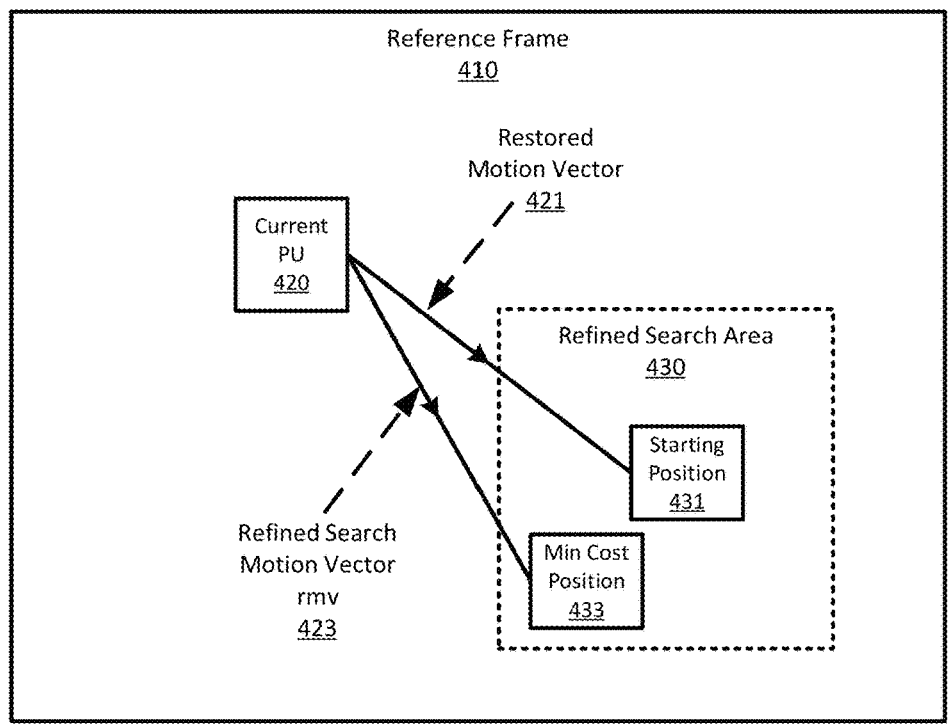
FIG. 4 shows a diagram illustrating a refined search scenario.

FIG. 4 shows a diagram illustrating a refined search scenario. In FIG. 4, based on the coarse search vector, the refined search module may identify a refined search area in the reference frame for each PU, and then find a refined search vector with the lowest cost corresponding to the PU in the refined search area. Refined search operations are carried out within the boundary of the reference frame 410. Specifically, each current CTU contains multiple PUs. Refined search may be carried out by selecting, one-by-one in a particular order from these PUs, the current PU.

Once the current PU location 420 is determined, the refined search area 430 is set in the reference frame for the PU according to the coarse search vector (or restored motion vector 421) previously obtained. Then, according to the restored motion vector 421, a starting search position 431 corresponding to the current PU location 420 is determined in the refined search area 430. Similar to the coarse search method, within the refined search area 430, using the starting search position 431 pixel as the center, the cost of each sub-block with the same size as the current PU may be calculated in turn, focusing on each pixel in the starting search position 431 and refined search area 430. Once the minimum/lowest cost position 433 is found, the motion vector between the current PU position 420 and the minimum cost position 433 is calculated, which is then recorded as refined search motion vector 423.

In some embodiments, based on the coarse search vector, the refined search module may be configured to set a refined search area in the reconstructed image of the reference frame for each PU block, and to generate a refined search vector with the least cost corresponding to this PU block in the refined search area. Further, refined search module may be configured to generate, based on the motion vector information around the current CTU, one or more prediction motion vectors that may serve the same purpose/function as the coarse search vector, and then to generate the refined search vector on the basis of prediction motion vector. Afterward, these generated refined search vectors may be transported to the fractional-pixel search module for further processing.

Figure 13:
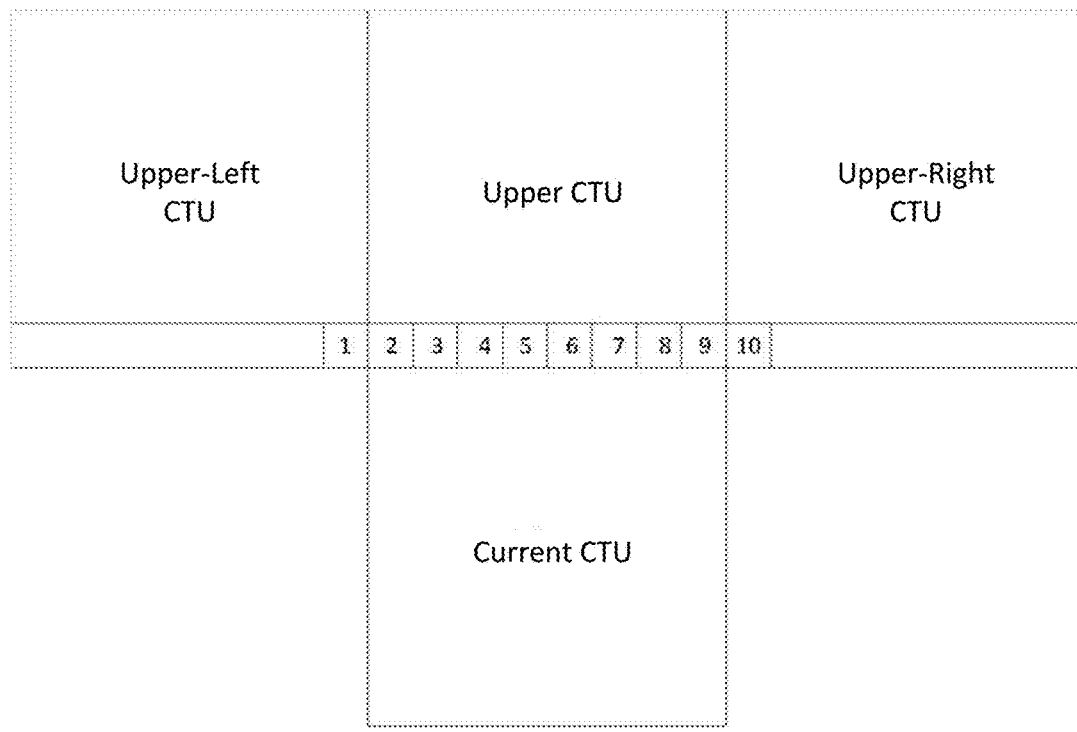
FIG. 13 shows a diagram illustrating coarse search result and motion vector information.

FIG. 13 shows a diagram illustrating coarse search result and motion vector information, according to certain embodiments of the present disclosure. As shown in FIG. 13, with respect to a current CTU block with the size of 64×64 pixels, for the 10 sub-blocks with size of 8×8 (labeled with 1-10 in FIG. 13), there may be a corresponding coarse search result and motion vector information in the upper-left adjacent CTU block and the upper-right adjacent CTU block. In addition, there may be 16 assistant motion vectors in the current CTU block, resulting in a total of at most 28 motion vectors ("MVs") as adjacent motion vectors, all of which may be referred to as the motion vector information around the current CTU block. These 28 motion vectors may be filtered, and a preset number of adjacent MVs (such as 3) may be picked and transmitted to the refined search module, in which the same preset number of refined search motion vectors may be determined. In this embodiment, the selected preset number of adjacent MVs may serve the same function and have the identical effect as the search results obtained by the coarse search module. That is, the selected adjacent MVs may be outputted to the refined search module for further processing.

In some embodiments, the coarse search module may output a motion vector to the refined search module, and then transmit several MVs from the adjacent MVs to the refined search module. Assuming that there are N number of MVs outputting to the refined search module, the refined search module may also generate N number of refined search RMVs (Refined Search Vectors), and outputting all N refined search vectors to FME (i.e. fractional-pixel search module). By calculating the costs, the FME may obtain an optimal fme_mv (fractional-pixel search vector) from the N refined search MVs. The optimal fme_mv may then be transmitted to the precise comparison module.

Figure 5:
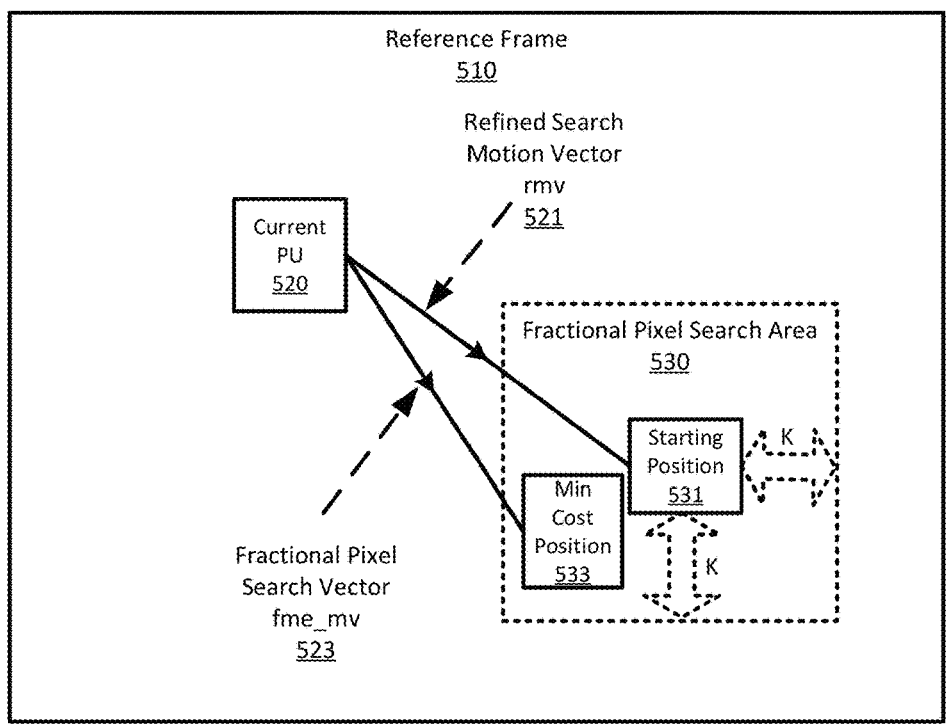
FIG. 5 shows a diagram illustrating a fractional-pixel search scenario.

FIG. 5 shows a diagram illustrating a fractional-pixel search scenario. In FIG. 5, in order to further improve the search accuracy, the fractional-pixel search module 215 may be configured to set a corresponding fractional-pixel search area 530 in the reference frame for each PU block, according to each received refined search vector, and generate a fractional-pixel search vector 423 with least cost of the PU block in the fractional-pixel search area 530. Specifically, the fractional-pixel search area 530 can be determined in the following approach: based on the current PU location 520 and the refined search motion vectors acquired before, the starting search position 531 corresponding to the current PU location 520 can be determined in the reference frame 510.

In some embodiments, using the starting search position pixel as the center, K pixels can be respectively expanded in the four up and down directions, so that a square area with 2K side length may be the fractional-pixel search area 530. Similar to the refined search method, using the starting search position 531 pixel as the center, the costs of sub-blocks with the same size as the current PU may be calculated in turn, by focusing on each pixel in the starting search position 531 and the fractional-pixel search area 530. Once the minimum cost position 533 is found, the motion vector between the current PU position and the minimum cost position 533 may be calculated. Such motion vector may be recorded as a fractional-pixel search motion vector 523.

Figure 7:
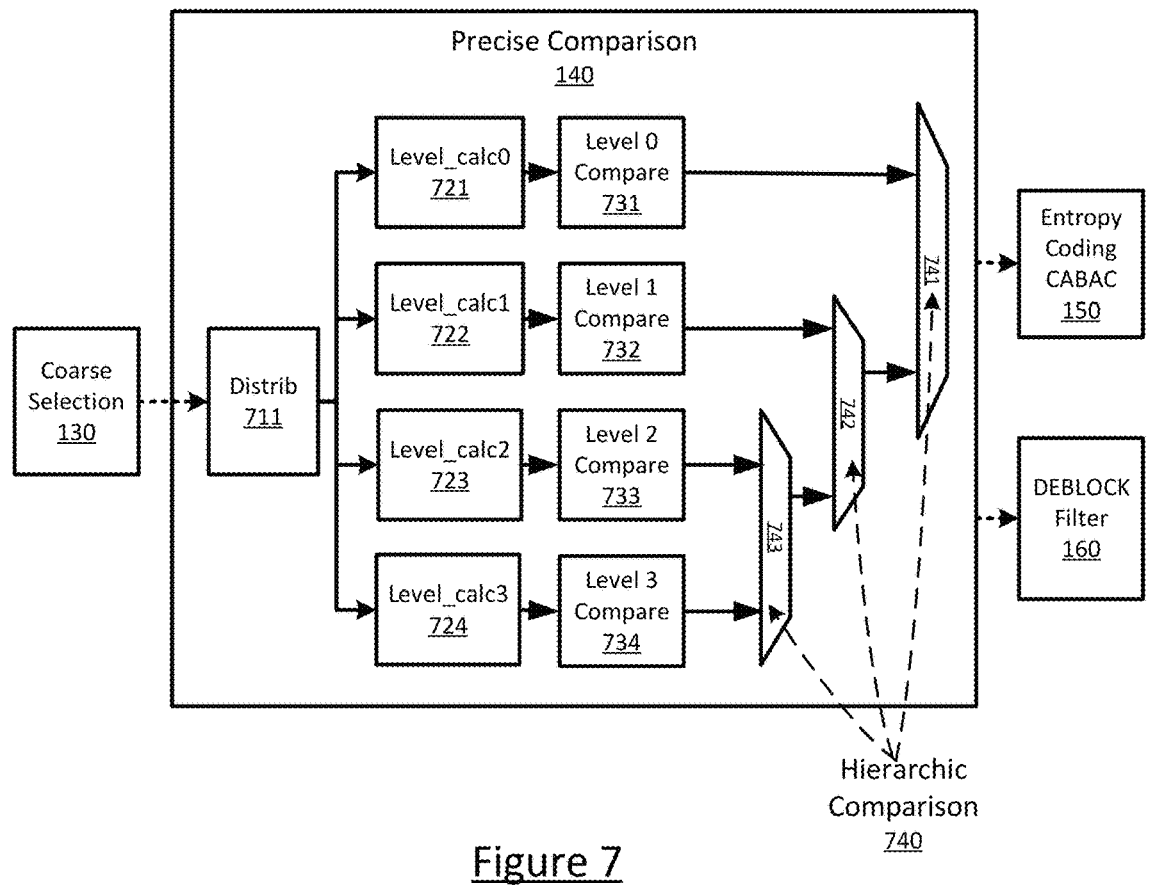
FIG. 7 shows a diagram illustrating an embodiment of the precise comparison module in the H.265 encoding device.

FIG. 7 shows a diagram illustrating an embodiment of the precise comparison module in the H.265 encoding device. In some embodiments, the precise comparison module 140 includes a distributing module 711, multiple single-stage calculating modules (such as 721, 722, 723, and 724), and multiple hierarchic comparison modules 740. The distributing module 711 is connected with the coarse selection module 130 and multiple single-stage calculating modules, while each single-stage calculating module is connected with a corresponding level compare module (e.g., modules 731, 732,733, and 734) and a hierarchical comparison module 740.

Specifically, the distributing module 711 may be configured to distribute the specific prediction information corresponding to the CU block in each partition mode to different single-stage calculating module, according to the specific partition mode of each CTU block.

The single-stage calculating module may be configured to calculate multiple cost information, base on the prediction information corresponding to the CU block received from the distributing module 711, and then compare them within the same level to select a prediction mode and partition mode with the least cost corresponding to the CU block.

The hierarchic comparison module 740 may be configured to compare the cost information of different levels calculated by the single-stage calculating module, and select the partition mode with the least cost for CTU blocks plus the corresponding coding information.

In some embodiments, the precise comparison module 140 in FIG. 7 includes four single-stage calculating modules 721, 722, 723 and 724. Each of the single-stage calculating modules 721, 722, 723 and 724 may be constructed based on the single-stage calculating module 810 in FIG. 8.

Figure 8:
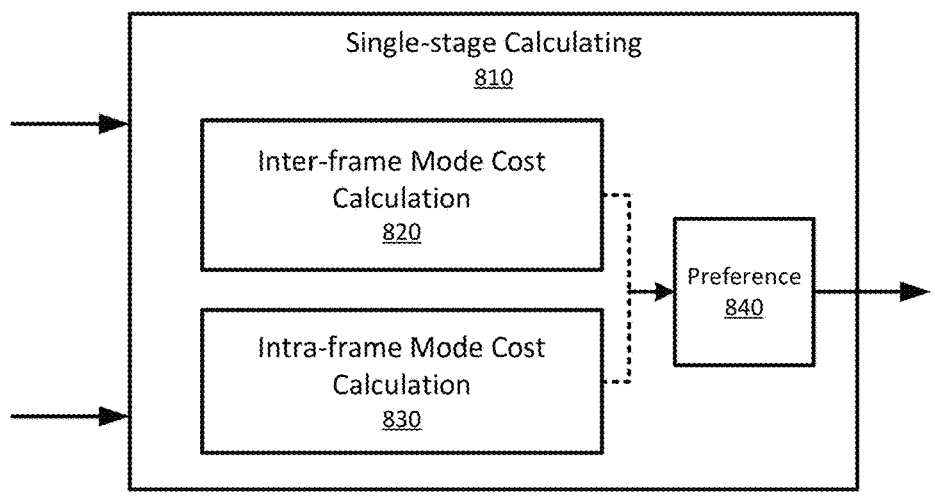
FIG. 8 shows a diagram illustrating an embodiment of the single-stage calculation module.

FIG. 8 shows a diagram illustrating an embodiment of the single-stage calculation module. As shown in FIG. 8, the single-stage calculating module 810 includes the inter-frame mode cost calculation module 820, the intra-frame mode cost calculation module 830 and preference module 840. For each inputted CU, the single-stage calculating module 810 can calculate an inter-frame cost through the inter-frame mode cost calculation module 820, calculate an intra-frame cost through the intra-frame mode cost calculation module 830, then make a comparison using the inter-frame cost and intra-frame cost through the preference module 840, in order to determine a partition mode and a prediction mode with the lowest comprehensive cost, that is, the partition mode and prediction mode with the least cost corresponding to the current inputted CU.

Referring back to FIG. 7, each single-stage calculating module 721, 722, 723 and 724 may be configured to process a certain level of CU block. For example, single-stage calculating module 721 can be set as a Level_calc1 for processing the CU blocks with size of 64×64; single-stage calculating module 722 can be set as a Level_calc2 for processing the CU blocks with size of 32×32; single-stage calculating module 723 can be set as a Level_calc3 for processing the CU blocks with size of 16×16; single-stage calculating module 724 can be set as a Level_calc4 for processing the CU blocks with size of 8×8. Assuming that the precise comparison module 140 receives a CTU from the coarse selection module 130 and the corresponding partition mode, prediction information, as well as multiple inter-frame motion vectors and reference information, the distributing module 711 can distribute the CU to the different levels of calculating module 721-724, according to the size of the CU under various partition modes.

In some embodiments, the intra-frame mode cost calculation module 830 in each single-stage calculating module may receive one or more intra-prediction information related to a certain level CU, and calculate and select an intra-frame cost for this CU. The inter-frame mode cost calculation module 820 of each single-stage calculating module may simultaneously/parallelly receive one or more inter-frame motion vectors and reference information related to a certain level of CU, and calculate and select a corresponding inter-frame cost for this CU. Afterwards, the preference module 840 of each single-stage calculating module may select a minimum coat from the intra-frame cost and inter-frame cost that have been calculated. In other words, when the minimum cost is the intra-frame cost, it is determined to better use the relevant intra-prediction information for H.265 encoding; when the minimum cost is the inter-frame cost, it is determined to better use the relevant inter-frame motion vector and reference information for H.265 encoding.

In some embodiments, the hierarchic comparison module 743 can make a comparison of the minimum cost of four 8×8 blocks by summing together the costs calculated by the Level_calc4 module 724, and the minimum cost of one 16×16 block calculated by Level_calc4 module 723, in order to select a partition mode with the lower cost. Specifically, one of the hierarchic comparison subjects is four 8×8 blocks (assumed to be A, B, C, D), which can be all minimum cost blocks acquired from the inter-frame comparison, all minimum cost blocks acquired from the intra-frame comparison, or a mix of both. For example, block A can be selected from inter-frame calculation, and blocks B, C and D can be selected from intra-frame calculations. Or blocks A and C can be selected from inter-frame calculations while blocks B and D can be selected from intra-frame calculations.

Similarly, the hierarchic comparison module 742 can select four 16×16 blocks with minimum costs obtained from the hierarchic comparison module 743, and then combine together to compare with one 32×32 block with the minimum cost that is calculated/selected by the Level_calc2 module 722. Specifically, the four 16×16 blocks selected by the hierarchic comparison module 742 (assumed to be E, F, G, H blocks) can include a full and complete 16×16 CU block, or can be composed of multiple 8×8 blocks. For example, E block can be a complete 16×16 CU block selected from inter-frame calculation; F block can be a 16×16 CU block selected from intra-frame calculation, and G block can be a 16×16 block composed of four 8×8 blocks selected from inter-frame and intra-frame calculations.

Similarly, the hierarchic comparison module 741 can select four 32×32 blocks with minimum costs from the hierarchic comparison module 742, and then combine together to compare with 64×64 block with minimum cost calculated from the Level_calc1 module 721. Specifically, the four 32×32 blocks selected by the hierarchic comparison module 741 (assumed to be I, J, K, L blocks) can include a complete 32×32 CU block, or can be composed of more 16×16 blocks, each 16×16 block composed of more 8×8 blocks. For example, I block can be a 32×32 CU block selected from inter-frame calculation; J block can be composed of four 16×16 CU blocks selected from inter-frame and intra-frame calculations; and one or more 16×16 blocks in K block can be respectively composed of several 8×8 blocks selected from inter-frame and intra-frame calculations.

Through the above approaches, the hierarchic comparison module 740 can find the combination of CTU, CU, and PU blocks with minimum cost, and select the partition mode with minimum cost for the CTU blocks and the corresponding coding information.

Figure 9:
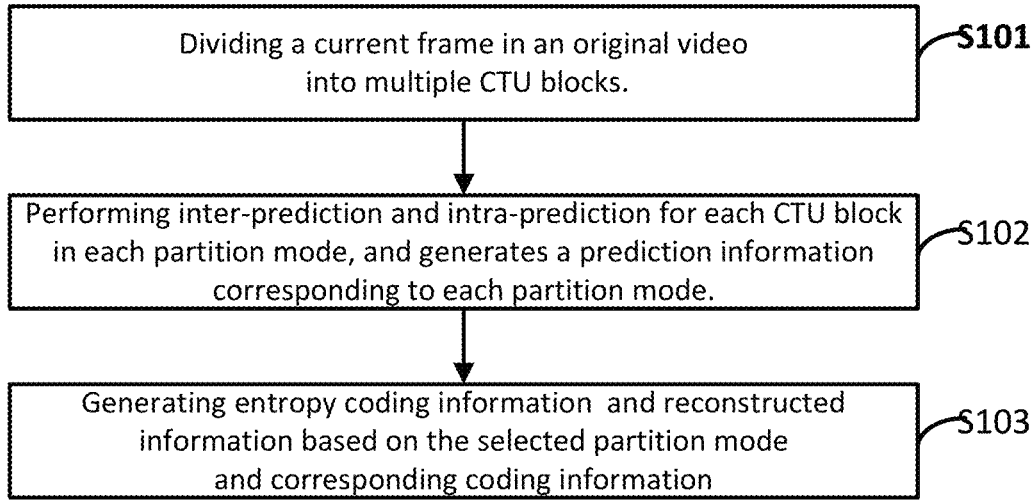
FIG. 9 shows a flow diagram illustrating one example process for H.265 encoding.

FIG. 9 shows a flow diagram illustrating one example process for H.265 encoding, in accordance to certain embodiments of the present disclosure. The process sets forth various functional blocks or actions (as shown in e.g., S101, S102, and S103) that may be described as processing operations, events, and/or acts, which may be performed by hardware, software, and/or firmware. The process in FIG. 9 may be performed by a H.265 encoding device including a pre-processing module, a coarse selection module, and a precise comparison module.

One skilled in the art will appreciate that, for this and other processes and methods disclosed herein, the functions performed in the processes and methods may be implemented in differing order. Furthermore, the outlined actions and operations are only provided as examples, and some of the actions and operations may be optional, combined into fewer actions and operations, or expanded into additional actions and operations without detracting from the essence of the disclosed embodiments. Moreover, one or more of the outlined actions and operations may be performed in parallel.

At operation S101, a preprocessing module may divide a current frame in an original video into multiple CTU blocks. At operation S102, a coarse selection module may divide each CTU block according to multiple partition modes, each partition mode dividing one CTU block into corresponding several CU blocks, and dividing each CU block into corresponding one or more PU blocks. Afterward, coarse selection module may perform inter-prediction and intra-prediction for each CTU block in each partition mode, and generates a prediction information corresponding to each partition mode.

At operation S103, the precise selection module may perform cost comparison using the prediction information corresponding to each CTU block in each partition mode, in order to select for each CTU block a partition mode with minimum cost and coding information corresponding to this partition mode. Afterward, the precise selection module may generate entropy coding information based on the selected partition mode and corresponding coding information. The entropy coding information may be used to generate H.265 coding stream associated with the current frame, and used to generate reconstructed information, which may be used to generate reconstructed frame from the current frame.

In some embodiments, the encoding device may also include an entropy coding module, which is connected with precise comparison module. The above process may further include the following operations: the entropy coding module generates H.265 coding stream corresponding to the current frame, according to the partition mode with the least cost corresponding to each CTU block and the entropy coding information generated from the corresponding coding information associated with the current frame.

In some embodiments, the encoding device may further include a post-processing module connected to the precise comparison module. The above process may further include; the post-processing module generates reconstructed frame corresponding to the current frame based on the partition mode with the least cost corresponding to each CTU block, and generates the reconstructed information from the corresponding coding information associated with the current frame.

Preferably, the post-processing module includes a deblocking filter module and a SAO module, the deblocking filter module connecting with the SAO module. The above process may further include: the deblocking filter module filters the reconstructed frame by using the partition mode with the least cost and corresponding coding information provided by precise comparison module; and the SAO module may be configured to perform SAO calculation using the reconstructed frames after filtering, and transmit the calculated data to the entropy coding module.

In some embodiments, the coarse selection module may include an inter-prediction coarse selection module and an intra-prediction coarse selection module. The inter-prediction module respectively is connected with the pre-processing module and the precise comparison module, while the intra-prediction module respectively is connected with pre-processing module and precise comparison module. The above process may include: the inter-prediction coarse selection module carries out the inter-prediction on each PU block in each partition mode, selects one or more reference information obtained from the reference frame with a cost less than the preset cost relative to each PU block, and regards the selected motion vector referring to PU block as the prediction information corresponding to the partition mode. The intra-prediction coarse selection module carries out the intra-prediction on each PU block in each partition mode, selects one or more intra-prediction direction with a cost less than the preset cost relative to each PU block, and regards the selected intra-prediction direction as the prediction information corresponding to the partition mode.

In some embodiments, the intra-prediction coarse selection module may further include a reference pixel generation module. The above process may include: the reference pixel generation module may be configured to generate a reference pixel for each PU block in each partition mode based on the original pixel of the current frame, and predict multiple intra-prediction directions to obtain the prediction results for each direction based on the reference pixel and the H.265 protocol. The reference pixel generation module may respectively calculate the distortion costs of the prediction results of these direction in view of original pixel, and choose, by ranking from low to high the costs, one or more intra-prediction directions with low cost.

Figure 10:
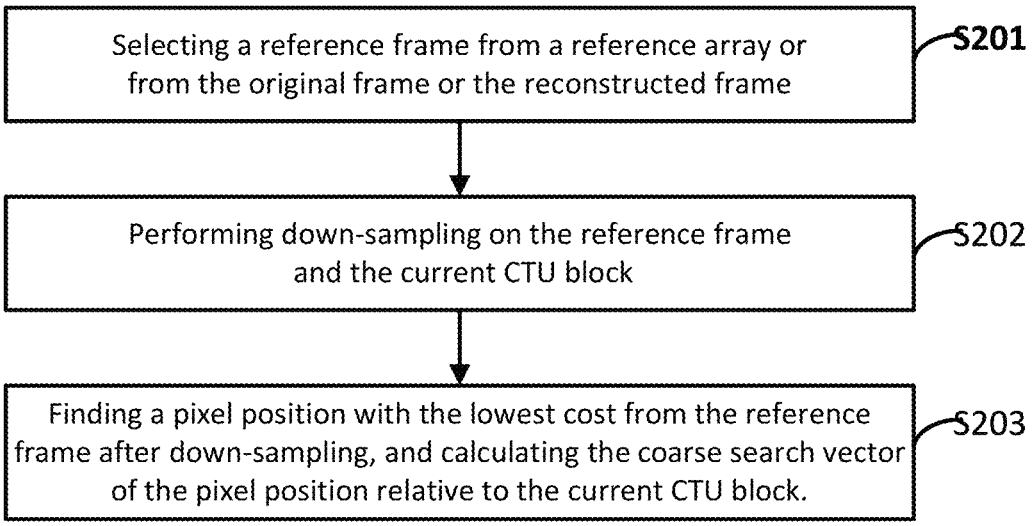
FIG. 10 shows a flow diagram illustrating one example process for performing coarse search during H.265 encoding.

FIG. 10 shows a flow diagram illustrating one example process for performing coarse search during H.265 encoding. As shown in FIG. 10, in some embodiments, the inter-prediction coarse selection module may include a coarse search module, a refined search module, and a fractional-pixel search module. The coarse search module is connected with the preprocessing module and the refined search module, while the refined search module is connected with the fractional-pixel search module. The process shown in FIG. 10 includes the following operations:

At operation S201, the coarse search module either selects a reference frame from a reference array, or selects the reference frame from the original frame or the reconstructed frame. At operation S202, the coarse search module may perform down-sampling on the reference frame and the current CTU block. At operation S203, the coarse search module may find a pixel position with the lowest cost from the reference frame after the down-sampling. The coarse search module may then calculate the coarse search vector of above pixel position relative to the current CTU block.

Figure 11:
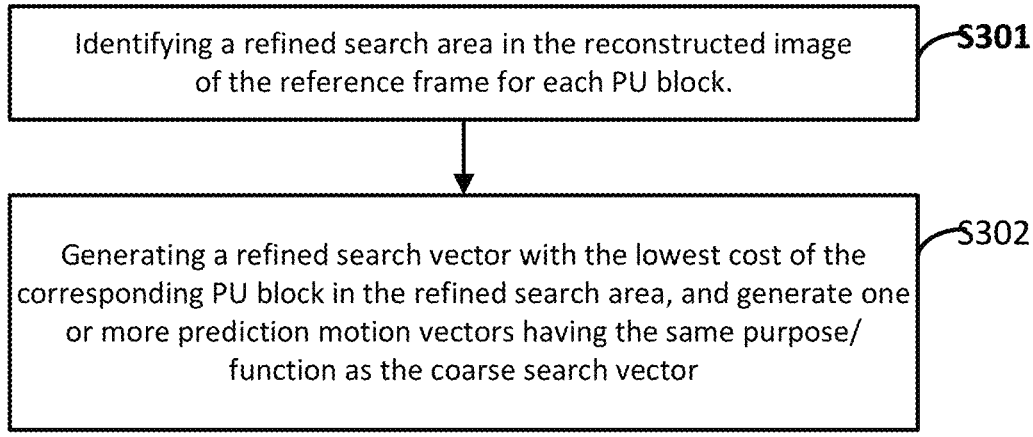
FIG. 11 shows a flow diagram illustrating one example process for performing refined search during H.265 encoding.

FIG. 11 shows a flow diagram illustrating one example process for performing refined search during H.265 encoding. As shown in FIG. 11, in some embodiments, the process described as follows:

At operation S301, based on the coarse search vector, the refined search module identifies a refined search area in the reconstructed image of the reference frame for each PU block. At operation S302, the refined search module may generate a refined search vector with the lowest cost of the corresponding PU block in the refined search area, and generate one or more prediction motion vectors having the same purpose/function as the coarse search vector based on the motion vector information around the current CTU. Afterward, the refined search module may generate the refined search vector on the basis of prediction motion vector, and transport these generated refined search vectors to the fractional-pixel search module.

Figure 12:
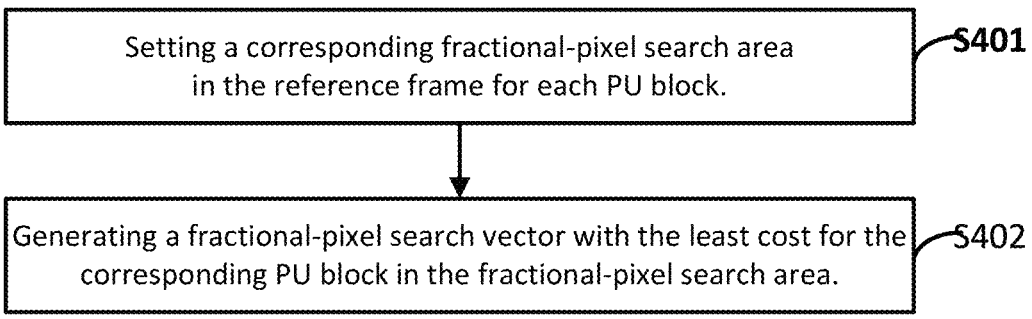
FIG. 12 shows a flow diagram illustrating one example process for performing fractional-pixel search during H.265 encoding.

FIG. 12 shows a flow diagram illustrating one example process for performing fractional-pixel search during H.265 encoding. As shown in FIG. 12, in some embodiments, the process includes:

At operation S401, based on each received refined search vector, the fractional-pixel search module sets a corresponding fractional-pixel search area in the reference frame for each PU block. At operation S402, the fractional-pixel search module may generate a fractional-pixel search vector with the least cost for the corresponding PU block in the fractional-pixel search area.

In some embodiments, the precise comparison module may further include a distributing module, multiple hierarchic calculating modules, and multiple hierarchic comparison modules, the distributing module connecting with the coarse selection module, while the hierarchic comparison module connecting with the distributing module. The above process may include:

Based on each partition mode of each CTU block, the distributing module distributes each CU block in each partition mode and the prediction information corresponding to the CU block to different hierarchic calculating modules.

Based on the received prediction information corresponding to the CU block, the hierarchical calculating module calculates multiple cost information and compares them within each level to select a prediction mode and partition mode corresponding to the lowest cost of the CU block.

The hierarchic comparison module may determine the costs corresponding to the prediction mode and partition mode selected from the hierarchic calculating module of different levels, and select the partition mode with the lowest cost for CTU blocks and the corresponding coding information.

Figure 15:
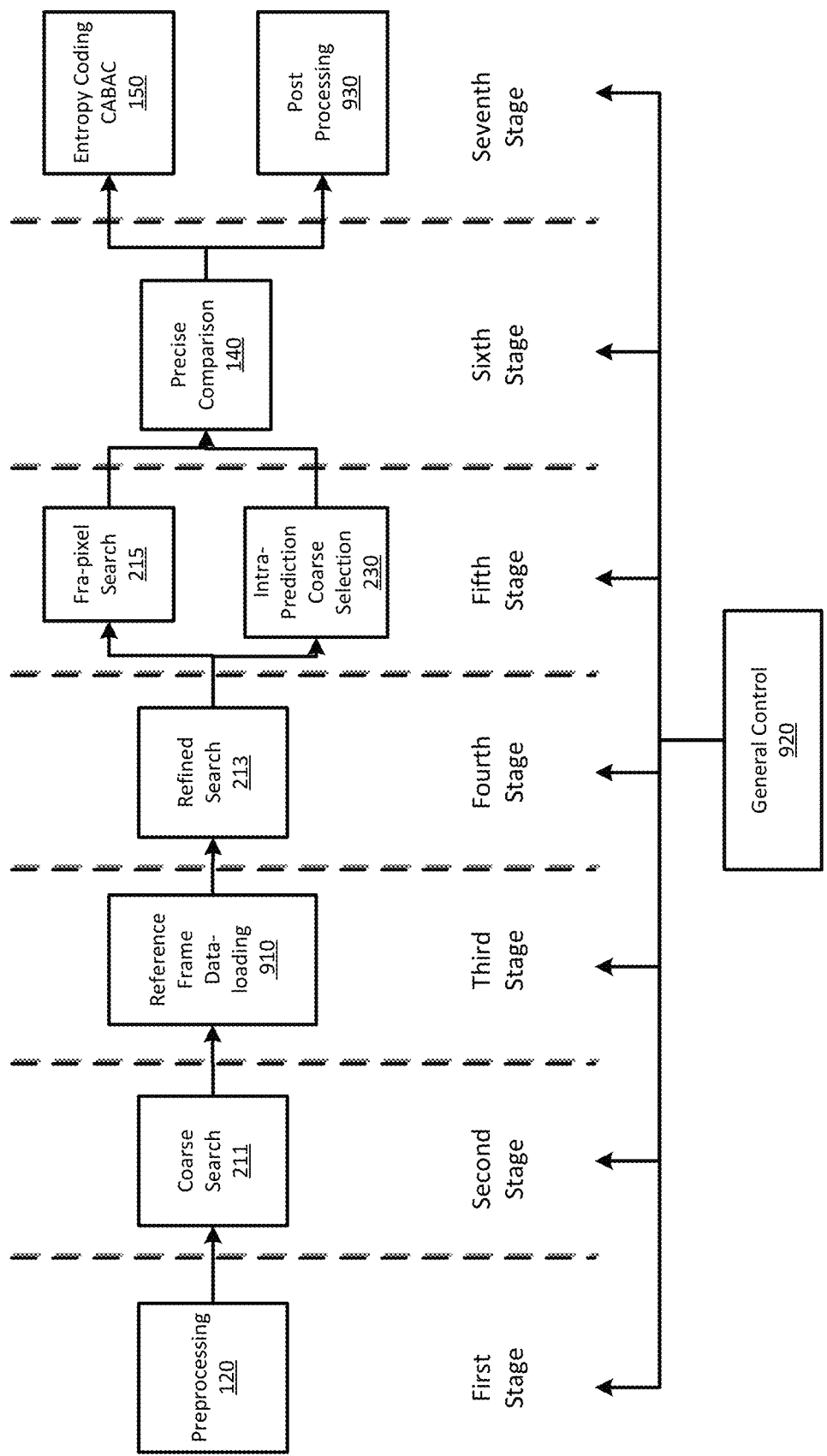
FIG. 15 shows one exemplary pipeline for performing H.265 encoding; all arranged in accordance to at least one or more embodiments of the present disclosure.

FIG. 15 shows one exemplary pipeline for performing H.265 encoding. In FIG. 15, a H.265 coding device may be implemented using a pipeline corresponding to the multiple operations performed in these embodiments. A "pipeline" may refer to a hardware implementation that divides the H.265 encoding process into multiple hardware stages, and executes these stages in parallel through a number of corresponding hardware processing units in order to increase the processing speed. A "pipeline stage" refers to a specific hardware module/configuration in a pipeline; a "pipeline level" refers to a specific pipeline step within a pipeline stage. In other words, a pipeline may include one or more pipeline stages; a pipeline stage may include one or more pipeline steps. When only one pipeline step is included in a pipeline stage, the pipeline stage and the pipeline step may be treated equally.

In some embodiments, a particular hardware module can support the operation of one or more pipeline stages. That is to say, all the pipeline steps in the one or more pipeline stages are run by the hardware module (or by the sub-modules included therein). In other embodiments, a particular hardware module can support the operation of at least one pipeline step. If there are more than one pipeline steps in one pipeline stage, the hardware module is only responsible for the operation of one or more specific pipeline steps in the pipeline stages. In other words, the pipeline stage can be implemented by several hardware modules, each of which is responsible for running the corresponding pipeline steps in the corresponding pipeline stage.

In some embodiments, the H.265 encoding device may be implemented in a computer chip having multiple modules and multiple pipeline stages, each of which includes at least one pipeline step for executing at least one module.

These multiple modules may include: a preprocessing module 120, a coarse selection module 130, a precise comparison module, 140 and a general control module 920. The general control module 920 may be respectively connected with the preprocessing module 120, the coarse selection module 130, and the precise comparison module 140.

The multiple pipeline stages may include a preprocessing stage (first stage in FIG. 15), a coarse selection stage (second stage), and a precise comparison stage (fourth stage). The coarse selection stage is executed after the preprocessing stage, and the precise comparison stage is executed after the coarse selection stage.

In some embodiments, the preprocessing stage may be configured to implement the preprocessing module 120. Specifically, during the preprocessing stage, the preprocessing module 120 may divide a current frame of an original video into several CTU blocks. Further, the preprocessing module may obtain an original image frame from the original video or select a current frame from the original image frame.

In some embodiments, the coarse selection stage may be configured to implement the coarse selection module 130. Specifically, the coarse selection module 130 may divide each CTU block according to multiple partition modes, and perform inter-prediction and intra-prediction based on each partition mode for each CTU block, in order to generate a prediction information corresponding to each partition mode.

As previously shown in FIG. 2, the coarse selection module may include the inter-prediction module and the intra-prediction module, and the coarse selection stage may include an inter-prediction coarse selection pipeline step and an intra-prediction coarse selection pipeline step.

In some embodiments, the inter-prediction module, when being invoked during the inter-prediction coarse selection pipeline step, may be configured to divide each CTU block according to multiple partition modes, and perform the inter-prediction in each partition mode for each CTU block, in order to generate a prediction information corresponding to each partition mode.

In some embodiments, the intra-prediction module, when being invoked during the intra-prediction coarse selection pipeline step, may be configured to perform intra-prediction of each PU block in each partition mode and calculate the corresponding cost in order to select one or more intra-prediction directions based on the costs associated with the PU blocks. The intra-prediction module may then take the selected intra-prediction direction as the prediction information corresponding to the partition mode.

In some embodiments, the precise comparison module 140, when being invoked during the precise comparison pipeline stage, may be configured to calculate and compare the cost of prediction information corresponding to each partition mode for each CTU block, select a partition mode with the lowest/least cost for each CTU block and the coding information relating to the partition mode, then generate an entropy coding information that may be used to generate H.265 stream from the current frame, and generate reconstructed information that may be used to generate reconstructed frame from the current frame. In this approach, the search accuracy may be improved from distributed and pipelined search, while the details of reconstructed image are better preserved, and the consumption of hardware resources is reduced.

In some embodiments, the general control module 920 may be configured to control the storage and the extraction of the original frame data and reference frame data, and control the preprocessing module, the coarse selection module, and the precise comparison module to perform corresponding pipeline stages in sequential order or in parallel. Preferably, the coarse selection pipeline stage is executed after the preprocessing pipeline stage, and the precise comparison pipeline stage is executed after the coarse selection pipeline stage. In short, when the coarse selection module performs the coarse selection pipeline stage corresponding to the current frame, the preprocessing module can simultaneously perform the preprocessing pipeline stage of the next frame corresponding to the current frame. When the precise comparison module performs the precise comparison pipeline stage corresponding to the current frame, the coarse selection module can simultaneously perform the coarse selection pipeline stage of the next frame corresponding to the current frame, and so on. Thus, the above approach may allow multiple modules to be pipelined, thereby achieving hardware module efficiency.

In some embodiments, the coarse selection module 130 may include the inter-prediction coarse selection module, and the precise comparison module 140 may include the intra-prediction coarse selection module. In this case, the coarse selection pipeline stage may include the inter-prediction coarse selection pipeline step, and the precise comparison pipeline stage may include the intra-prediction coarse selection pipeline step.

In some embodiments, the inter-prediction module, when being invoked during the inter-prediction coarse selection pipeline step, may be configured to divide each CTU block according to multiple partition modes, and perform the inter-prediction in each partition mode for each CTU block to obtain the reference frame information, in order to generate a prediction information corresponding to each partition mode.

In some embodiments, the intra-prediction module, when being invoked during the intra-prediction coarse selection pipeline step, may be configured for intra-prediction of each PU block in each partition mode and calculating the corresponding costs, in order to select one or more intra-prediction directions according to the cost relative to each PU block, and to generate the selected intra-prediction direction as the prediction information corresponding to the partition mode.

In summary, in actual implementation, the intra-prediction module can be integrated into either the coarse selection module or the precise comparison module 140, thus broadening the application scenario for the device.

In some embodiments, the inter-prediction module may include a coarse search module 211, a reference frame data-loading module 910, a refined search module 213, and a fractional-pixel search module 215. The coarse selection pipeline stage may include a coarse search pipeline step, a reference frame data-loading pipeline step, a refined search pipeline step, and a fractional-pixel search pipeline level corresponding to the above modules.

In some embodiments, the coarse search module, when being invoked during the coarse search pipeline step, may be configured to select a frame from the reference array, or to select a reference frame from its original frame or reconstructed frame. Further, the coarse search module may be configured to perform down-sampling on the reference frame and current CTU block, to find the lowest cost pixel position from the reference frame in comparison with the CTU block, and to calculate the coarse search vector relative to the current CTU block.

In some embodiments, the reference frame data-loading module, when being invoked during the reference frame data-loading pipeline step, may obtain, through the general control module, the coarse search vector from the coarse search pipeline step, and obtain one or more prediction motion vectors. Based on the aforementioned coarse search vector and one or more prediction motion vectors, the reference frame data-loading module may then load the reference frame data and transfer them to the refined search pipeline step through the general control module.

In some embodiments, the refined search module, when being invoked during the refined search pipeline step, may be configured to set a refined search area in the reconstructed image of the reference frame for each PU block, and to generate a refined search vector with the least cost for the corresponding PU block in the refined search area. Further, the refined search module may generate one or more prediction motion vectors according to the motion vector information around the current CTU, and generate the refined search vector on the basis of prediction motion vectors.

These generated refined search vectors may be transported to the fractional-pixel search module through the general control module.

In some embodiments, the fractional-pixel search module, when being invoked during the fractional-pixel search pipeline step, may be configured to set a corresponding fractional-pixel search area in the reference frame for each PU block according to each received refined search vector. The fractional-pixel search module may then generate a fractional-pixel search vector in the fractional-pixel search area with the least cost corresponding to the PU block. Preferably, the intra-prediction coarse selection pipeline step and the fractional-pixel search pipeline step may be the same pipeline step, and the intra-prediction coarse selection module and the fractional-pixel search module are executed in parallel in the same pipeline step.

In some embodiments, the intra-prediction coarse selection module includes the reference pixel generation module, which is executed during the intra-prediction coarse selection pipeline step.

In some embodiments, the intra-prediction coarse selection pipeline step and the fractional-pixel search pipeline step may be different pipeline steps, and the intra-prediction coarse selection module is executed during a pipeline level that is after the fractional-pixel search module. The intra-prediction coarse selection module includes reference pixel generation module, which is executed in the intra-prediction coarse selection pipeline step.

In some embodiments, the intra-prediction coarse selection module 230 may include the reference pixel generation module, and the intra-prediction coarse selection module 230 may be executed in the intra-prediction coarse selection pipeline step.

In some embodiments, the encoding device may also include a post-processing module 930, which is connected to the precise comparison module 140. The post-processing module may be executed in a post-processing pipeline stage (seventh stage in FIG. 15), which may be configured to generate the reconstructed frame corresponding to the current frame, according to the partition mode with the least cost corresponding to each CTU block which is outputted by the precise comparison module plus the corresponding reconstruction information.

In some embodiments, the post-processing module 180 may include a deblocking filter module and a SAO module, and the post-processing pipeline stage may include the deblocking filter pipeline step and the SAO step, the deblocking filter module is executed in the deblocking filter pipeline step, while the SAO module is executed in the SAO step. Taking advantage of the partition mode with the least cost provided by the precise comparison module and the corresponding reconstructed information, the deblocking filter pipeline step may be configured to filter the reconstructed frame. The SAO pipeline step may be configured to SAO calculation for reconstructed frames after filtering, in order to obtaining the final reconstructed frame for reference and display. The deblocking filter pipeline step and the SAO pipeline step are sequentially or parallel executed at the post-processing pipeline stage.

In some embodiments, the encoding device may also include an entropy coding module 150 connected to precise comparison module 140. The entropy coding module 150 may be executed in the entropy coding pipeline step (also in the seventh stage in FIG. 15). The entropy coding pipeline step may be configured to generate H.265 stream corresponding to the current frame, based on the partition mode with the least cost corresponding to each CTU block which is outputted by the precise comparison module 140, and based on the entropy coding information generated from the corresponding coding information related to the current frame. The entropy coding pipeline step is executed in parallel with the other pipeline steps at the same level in the post-processing pipeline stage.

Figure 14:
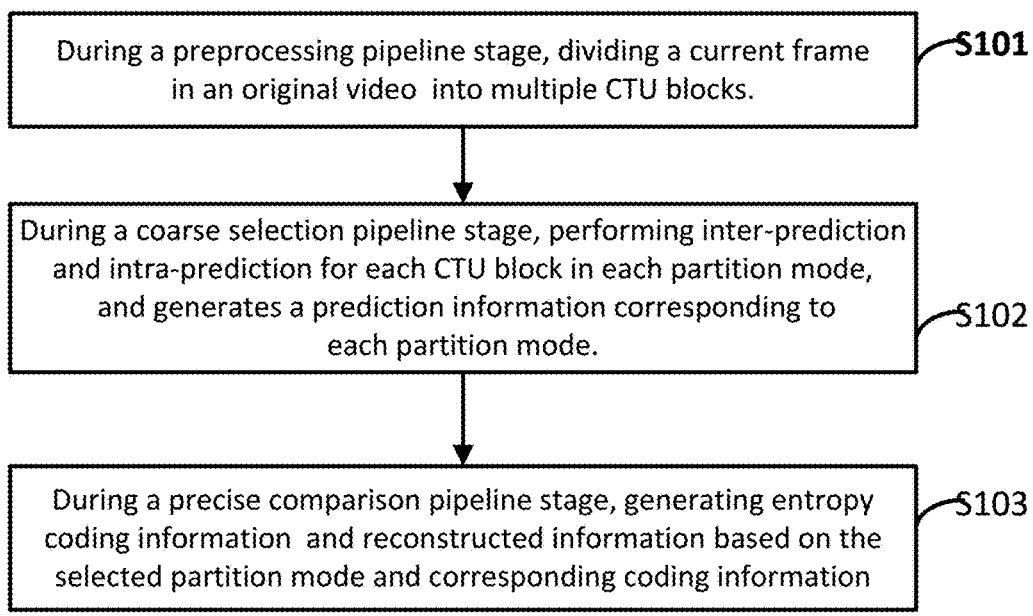
FIG. 14 shows a flow diagram illustrating one example process for using pipeline during H.265 encoding.

FIG. 14 shows a flow diagram illustrating one example process for using pipeline during H.265 encoding, in accordance to certain embodiments of the present disclosure. The process sets forth various functional blocks or actions (as shown in e.g., S101, S102, and S103) that may be described as processing operations, events, and/or acts, which may be performed by multiple modules and multiple pipeline stages, each of which includes at least one pipeline step for executing at least one module.

Specifically, multiple modules may include a preprocessing module, a selection module, a precise comparison module, and a general control module, and the general control module is respectively connected with the preprocessing module, the coarse selection module, and the precise comparison module. The multiple pipeline stages may include a preprocessing stage (first stage in FIG. 15), a coarse selection stage (second stage), and a precise comparison stage (fourth stage). The coarse selection stage is executed after the preprocessing stage, and the precise comparison stage is executed after the coarse selection stage.

The method may include the following operations: At operation S101, during the preprocessing stage, the preprocessing module 120 may divide a current frame 102 of an original video 100 into several CTU blocks. At operation S102, the coarse selection stage may be configured to implement the coarse selection module 130. Specifically, the coarse selection module 130 may divide each CTU block according to multiple partition modes, and perform inter-prediction and intra-prediction based on each partition mode for each CTU block, in order to generate a prediction information corresponding to each partition mode.

At operation S301, the precise comparison module 140, when being invoked during the precise comparison pipeline stage, may be configured to calculate and compare the cost of prediction information corresponding to each partition mode for each CTU block, select a partition mode with the least cost for each CTU block and the coding information relating to the partition mode, then generate an entropy coding information that may be used to generate H.265 stream from the current frame, and generate reconstructed information that may be used to generate reconstructed frame from the current frame.

In some embodiments, the general control module may be configured to control the storage and the extraction of the original frame data and reference frame data, and control the preprocessing module, the coarse selection module, and the precise comparison module to perform corresponding pipeline stages in order.

In some embodiments, as shown in FIG. 10, the coarse search module may include the inter-prediction coarse selection module and intra-prediction coarse selection module. The coarse search pipeline stage may include the inter-prediction coarse selection pipeline step and the intra-prediction coarse selection pipeline step.

The method further includes: in some embodiments, the inter-prediction coarse selection module, when being invoked during the inter-prediction coarse selection pipeline step, may be configured to divide each CTU block according to multiple partition modes, and perform the inter-prediction in each partition mode for each CTU block to obtain the reference frame information, in order to generate a prediction information corresponding to each partition mode.

In some embodiments, the intra-prediction coarse selection module, when being invoked during the intra-prediction coarse selection pipeline step, may be configured for intra-prediction of each PU block in each partition mode and calculating the corresponding cost, in order to select one or more intra-prediction directions according to the cost relative to each PU block, and generate the selected intra-prediction direction as the prediction information corresponding to the partition mode.

In some embodiments, the coarse selection module also includes the inter-prediction coarse selection module, and the precise comparison module also includes the intra-prediction coarse selection module. The coarse selection pipeline stage includes the inter-prediction coarse selection pipeline step, and the precise comparison pipeline stage includes the intra-prediction coarse selection pipeline step.

The method further includes: in some embodiments, the inter-prediction coarse selection module, when being invoked during the inter-prediction coarse selection pipeline step, may be configured to divide each CTU block according to multiple partition modes, and perform the inter-prediction in each partition mode for each CTU block to obtain the reference frame information, in order to generate a prediction information corresponding to each partition mode.

In some embodiments, the intra-prediction coarse selection module, when being invoked during the intra-prediction coarse selection pipeline step, may be configured for intra-prediction of each PU block in each partition mode and calculating the corresponding cost, in order to select one or more intra-prediction directions according to the cost relative to each PU block, and generate the selected intra-prediction direction as the prediction information corresponding to the partition mode.

In summary, in actual implementation, the intra-prediction coarse selection module 230 can be integrated into either the coarse selection module 130 or the precise comparison module 140, thus broadening the application scenario for the device.

In some embodiments, the inter-prediction coarse selection module may include a coarse search module, a reference frame data-loading module, a refined search module, and a fractional-pixel search module. The coarse selection pipeline stage may include a coarse search pipeline step, a reference frame data-loading pipeline step, a refined search pipeline step, and a fractional-pixel search pipeline level corresponding to the above modules.

The method further includes: in some embodiments, as shown in FIG. 10, the coarse search module may be invoked during the coarse search pipeline step. At operation S201, the coarse search module selects a frame from the reference array, or selects a reference frame from its original frame or reconstructed frame. At operation S202, the coarse search module may perform the down-sampling on the reference frame and current CTU block. At operation S203, the coarse search module may find the lowest cost pixel position from the reference frame in comparison with the CTU block, and calculate the coarse search vector relative to the current CTU block.

In some embodiments, the reference frame data-loading module, when being invoked during the reference frame data-loading pipeline step, may obtain, through the general control module, the coarse search vector from the coarse search pipeline step, and obtain one or more prediction motion vectors. Based on the aforementioned coarse search vector and one or more prediction motion vectors, the reference frame data-loading module may then load the reference frame data and transfer them to the refined search pipeline step through the general control module.

As shown in FIG. 11, the refined search module may be invoked during the refined search pipeline step. At operation S301, based on the coarse search vector, the refined search module sets a refined search area in the reconstructed image of the reference frame for each PU block. At operation S302, the refined search module generates a refined search vector with the least cost of the corresponding PU block in the refined search area, and generates one or more prediction motion vectors according to the motion vector information around the current CTU. Further, the refined search module generates the refined search vector on the basis of prediction motion vector. These generated refined search vectors may be transported to the fractional-pixel search module through the general control module.

As shown in FIG. 12, the fractional-pixel search module may be invoked during the fractional-pixel search pipeline step. At operation S401, according to each received refined search vector, the fractional-pixel search module sets a corresponding fractional-pixel search area in the reference frame for each PU block. At operation S402, the fractional-pixel search module generates a fractional-pixel search vector with the least cost of the corresponding PU block in the fractional-pixel search area.

In some embodiments, the intra-prediction coarse selection pipeline step and the fractional-pixel search pipeline step are at the same pipeline level, and the intra-prediction coarse selection module and the fractional-pixel search module may be executed in parallel at the same pipeline level. In short, the intra-prediction coarse selection pipeline step and the fractional-pixel search pipeline step may be executed in parallel (in synchronous or simultaneously), or may be performed in sequential order (that is, the intra-prediction coarse selection pipeline step is executed first, and then the fractional-pixel search pipeline step is executed).

In some embodiments, the intra-prediction coarse selection module includes reference pixel generation module that executed in the intra-prediction coarse selection pipeline level; the method includes as follows: in some embodiments, the multiple modules also include a post-processing module. The post-processing module may be executed in a post-processing pipeline stage (seventh stage in FIG. 15). The method may include the following: the post-processing module to generate the reconstructed frame corresponding to the current frame, according to partition mode with the least cost corresponding to each CTU block which is outputted by the precise comparison module plus the corresponding reconstructed information.

In some embodiments, the multiple modules may also include the entropy coding module, and the multiple pipeline steps also includes the entropy coding pipeline step. The method may include the following: the entropy coding module may be executed in the entropy coding pipeline step, which may generate binary coding stream which satisfies the H.265 protocol, based on the partition mode with the least cost corresponding to each CTU block which is outputted by the precise comparison module plus the corresponding entropy coding information.

As shown in FIG. 15, the preprocessing module 120 belongs to the Level_pipeline1 and is executed in the preprocessing pipelining stage (first stage). The coarse selection module may be executed in the coarse selection pipeline stages. Specifically, the coarse selection module may include coarse search module 211, the reference frame data-loading module 910, the refined search module 213, and the fractional-pixel search module 215. Correspondingly, the coarse selection pipeline steps may include the coarse search pipeline stage (second stage), the reference frame data-loading pipeline stage (third stage), the refined search pipeline stage (fourth stage) and the fractional-pixel search pipeline stage (fifth stage).

Preferably, the intra-prediction coarse selection module and the fractional-pixel search module may be executed in parallel at the same pipeline stage (both of them are executed in the fifth stage). The precise comparison module 140 is executes in the precise comparison pipeline stage, which belongs to the sixth stage. The entropy coding module 150 and post-processing module 930 are respectively executed in the entropy coding pipeline step and the post-processing pipeline step. The entropy coding pipeline step and the post-processing pipeline step may be executed in parallel in the seventh stage. The data transmission, scheduling, and controlling of the above seven stages may be through the general control module 920, which makes the executing process orderly and greatly improves the implementation efficiency.

Systems and methods for H.265 encoding have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, modules and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. An H.265 encoding device, comprises:
a preprocessing module; a coarse selection module; and a precise comparison module, wherein the preprocessing module is coupled with the coarse selection module, and the coarse selection module is coupled with the precise comparison module,
wherein
the preprocessing module is configured to divide a current frame from an original video into multiple CTU blocks,
the coarse selection module is configured to divide a CTU block selected from the multiple CTU blocks based on multiple partition modes, each one of the partition modes dividing the CTU block into corresponding CU blocks, and divides each one of the CU blocks into a corresponding one or more PU blocks,
the coarse selection module is further configured to perform inter-prediction and intra-prediction in each one of the partition modes for each one of the CTU blocks, and generate a prediction information corresponding to each one of the partition modes, and
the precise comparison module is configured to
perform cost comparison on the prediction information corresponding to each one of the partition modes for each one of the CTU blocks,
select a partition mode with the lowest cost for each one of the CTU blocks and the encoding information corresponding to the partition mode, and
generate entropy coding information and reconstruction information based on the selected partition mode and its corresponding encoding information,
wherein the entropy coding information is used for generating the current frame into an H.265 code stream, and the reconstruction information is used for generating the current frame into a reconstructed frame.

2. The H.265 encoding device according to claim 1, further comprising
an entropy coding module coupled with the precise comparison module, wherein the entropy coding module is configured to generate the current frame into the H.265 code stream based on the entropy coding information corresponding to the current frame.

3. The H.265 encoding device according to claim 2, further comprising
a post-processing module coupled with the precise comparison module, wherein the post-processing module is configured to generate the current frame into the reconstructed frame based on the reconstruction information.

4. The H.265 encoding device according to claim 3, wherein
the post-processing module comprises a deblocking filter module and a sample adaptive offset (SAO) module; the deblocking filter module is coupled with the SAO module connect,
the deblocking filtering module is configured to filter the reconstructed frame by using the lowest cost partition mode selected by the previse comparison module and the corresponding encoding information, and
the SAO module is configured to perform SAO calculation on the filtered reconstructed frame and transmit the calculated data to the entropy coding module.

5. The H.265 encoding apparatus according to claim 1, wherein the coarse selection module comprises an inter-prediction module and an intra-prediction module, the inter-prediction module is coupled with the preprocessing module and the precise comparison module, and the intra-prediction module is coupled with the preprocessing module and the precise comparison module, wherein the inter-prediction module is configured to perform inter-prediction on each PU block of the CTU block in each partition mode, select one or more PU blocks with reference information obtained from the reference frame and having cost less than a preset cost value, and determine a motion vector of the selected reference PU blocks as the prediction information corresponding to the partition mode;

the intra-prediction module is configured to perform intra-prediction on each PU block in each partition mode, and select one or more intra-frame prediction directions whose cost is less than a preset cost value relative to each PU block, wherein the selected intra prediction direction is used as the prediction information corresponding to the partition mode.

6. The H.265 encoding apparatus according to claim 5, wherein the intra-prediction module further comprises a reference pixel generation module, wherein the reference pixel generation module is configured to generate reference pixels for each PU block in each partition mode using the original pixels of the current frame and predict multiple intra-prediction directions based on the reference pixels according to H.265 protocol, obtain prediction results for the multiple directions and calculate distortion costs for the original pixels according to the prediction result of each direction, and sort the prediction costs from small to large to select one or more intra-prediction directions with lowest cost.

7. The H.265 encoding apparatus according to claim 5, wherein the inter-prediction module further comprises: a coarse search module, a refined search module, and a fractional pixel search module, the coarse search module is coupled with the preprocessing module, the coarse search module is coupled with the refined search module, and the refined search module is coupled with the fractional pixel search module.

8. The H.265 encoding device according to claim 7, wherein the coarse search module is configured to select a frame from a reference array, select a reference frame from the original frame or the reconstructed frame, perform down-sampling operation on the reference frame and the current CTU block, identify in the down-sampled reference frame the least expensive pixel location compared to the down-sampled CTU block, and calculate a coarse search vector for the pixel location relative to the current CTU block.

9. The H.265 encoding device according to claim 7, wherein the refined search module is configured to set a refined search area in a reconstructed image of the reference frame for each PU block according to the coarse search vector, generate motion vectors with minimum cost corresponding to the PU block in the refined search area, generate one or more predicted motion vectors with the same function as the coarse search vector according to the motion vectors around the current CTU block, and generate a refined search vector according to the predicted motion vectors, wherein the refined search vector is used by the fractional pixel search module.

10. The H.265 encoding device according to claim 9, wherein the fractional pixel search module is configured to set a corresponding fractional pixel search area in the reference frame for each PU block according to each received refined search vector, and generate a fractional pixel search vector with the least cost in the fractional pixel search area corresponding to the PU block.

11. The H.265 encoding device according to claim 1, wherein the precise comparison module comprises a distribution module, a plurality of hierarchical calculation modules, and a plurality of hierarchical comparison modules, the distribution module is coupled with the coarse selection module, and the hierarchical comparison modules are coupled with the distribution module, wherein the distribution module is configured to distribute each CU block in each partition mode and the prediction information corresponding to the CU block to different hierarchical calculation modules according to each partition mode of each CTU block, the hierarchical calculation module is used to calculate a plurality of cost information by performing intra-layer comparison according to the received CU block and the prediction information corresponding to the CU block, and select a prediction mode and a partition mode with the lowest cost corresponding to the CU block, and the hierarchical comparison modules are configured to compare the prediction modes and costs corresponding to the partition modes selected by the hierarchical calculation modules of different layers, and select the partition mode with the lowest cost for the CTU block and the corresponding coding information.

12. An encoding method performed by a H.265 encoding device, the H.265 encoding device includes a preprocessing module, a coarse selection module, and an accurate comparison module, the method comprises:

dividing, by the preprocessing module, a current frame from an original video into multiple CTU blocks;

dividing, by the coarse selection module, a CTU block selected from the multiple CTU blocks based on multiple partition modes, each one of the partition modes dividing the CTU block into corresponding CU blocks, and dividing each one of the CU blocks into a corresponding one or more PU blocks;

performing, by the coarse selection module, inter-prediction and intra-prediction in each one of the partition modes for each one of the CTU blocks, and generating a prediction information corresponding to each one of the partition modes;

comparing, by the precise comparison module, costs of the prediction information corresponding to each one of the partition modes for each one of the CTU blocks; and selecting, by the precise comparison module, a partition mode with the lowest cost for each one of the CTU blocks and the encoding information corresponding to the partition mode, and generating entropy coding information and reconstruction information according to the selected partition mode and its corresponding encoding information, wherein the entropy coding information is used for generating the current frame into an H.265 code stream, and the reconstruction information is used for generating the current frame into a reconstructed frame.

13. The H.265 encoding method according to claim 12, wherein the encoding device further comprises an entropy coding module, the method further comprises:
generating, by the entropy coding module, the current frame into the H.265 code stream based on the entropy coding information corresponding to the current frame.

14. The H.265 encoding method according to claim 13, wherein the encoding device further comprises a post-processing module, the post-processing module is coupled with the precise comparison module, the method further comprises:
generating, by the post-processing module, the current frame into the reconstructed frame based on the reconstruction information.

15. The H.265 encoding method according to claim 14, wherein the post-processing module comprises a deblocking filter module and a sample adaptive offset (SAO) module, the deblocking filter module is coupled with the SAO module connecting; the method further comprises:
filtering, by the deblocking filtering module, the reconstructed frame by using the lowest cost partition mode selected by the previse comparison module and the corresponding encoding information; and
performing, by the SAO module, SAO calculation on the filtered reconstructed frame, and transmitting the calculated data to the entropy coding module.

16. The H.265 encoding method according to claim 12, wherein the coarse selection module comprises an inter-prediction module and an intra-prediction module, the method further comprises:
performing, by the inter-prediction module, inter-prediction on each PU block in each partition mode, and using the motion vector of the PU block as prediction information corresponding to the partition mode;
performing, by the intra-prediction module, intra-prediction on each PU block in each partition mode, and using intra prediction direction as the prediction information corresponding to the partition mode.

17. The H.265 encoding method according to claim 16, wherein the intra-prediction module further comprises a reference pixel generation module, the method further comprises:
predicting, by the reference pixel generation module, all intra-prediction directions according to H.265 protocol, calculating costs based on the prediction results in each direction, and
selecting one or more intra-frame prediction directions with less cost.

18. The H.265 encoding method according to claim 16, wherein
the inter-prediction module further comprises: a coarse search module, a refined search module, and a fractional pixel search module,
the coarse search module is coupled with the preprocessing module,
the coarse search module is coupled with the refined search module.

19. The H.265 encoding method according to claim 12, wherein
the precise comparison module comprises a distribution module, a plurality of hierarchical calculation modules, and a plurality of hierarchical comparison modules, the distribution module is coupled with the coarse selection module, and the hierarchical comparison modules are coupled with the distribution module, the method further comprises:
distributing, by the distribution module, each CU block in each partition mode and the prediction information corresponding to the CU block to different hierarchical calculation modules;
calculating, by the hierarchical calculation modules, a plurality of cost information by performing intra-layer comparison, and selecting a prediction mode and a partition mode with the least cost corresponding to the CU block;
comparing, by the hierarchical calculation modules, the prediction modes and the costs corresponding to the partition modes selected by the hierarchical calculation modules of different layers, and selecting the partition mode with the lowest cost for the CTU block and the corresponding coding information.

20. An H.265 encoding device, comprises multiple modules and multiple pipeline stages, and each pipeline stage including at least one pipeline step for executing at least one of the modules, wherein:
the multiple modules include a preprocessing module, a coarse selection module, a precise comparison module, and a general control module, the general control module is respectively coupled with the preprocessing module, the coarse selection module, and the precise comparison module;
the multiple pipeline stages include a preprocessing stage, a coarse selection stage, and a precise comparison stage, the coarse selection stage being performed after the preprocessing stage, and the precise comparison stage being performed after the coarse selection stage;
the preprocessing stage is configured to divide a current frame from an original video into multiple CTU blocks;
the coarse selection stage is configured to divide each CTU block according to multiple partition modes through the coarse selection module, perform inter-prediction and intra-prediction for each partition mode of each CTU block, and generates a prediction information corresponding to each partition mode;
the precise comparison stage is configured to perform cost calculation and comparison on the prediction information corresponding to the respective partition modes of each CTU block through the precise comparison module, select a partition mode with the lowest cost for each CTU block, and generate entropy coding information and reconstruction information; and
the general control module is configured to control storage and retrieval of original frame and reference frame, and to control the preprocessing module, the coarse selection module, and the precise comparison module during sequentially or parallel executing of the corresponding pipeline stages.

* * * * *